(12) United States Patent
Ogata et al.

(10) Patent No.: US 9,945,706 B2
(45) Date of Patent: Apr. 17, 2018

(54) THERMAL-TYPE AIR FLOW METER

(71) Applicant: Hitachi Automotive Systems, Ltd., Ibaraki (JP)

(72) Inventors: Masatoshi Ogata, Tokyo (JP); Norio Ishitsuka, Tokyo (JP); Shinobu Tashiro, Hitachinaka (JP); Noboru Tokuyasu, Hitachinaka (JP); Takeshi Morino, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 107 days.

(21) Appl. No.: 14/907,118

(22) PCT Filed: Feb. 3, 2014

(86) PCT No.: PCT/JP2014/052383
§ 371 (c)(1),
(2) Date: Jan. 22, 2016

(87) PCT Pub. No.: WO2015/011936
PCT Pub. Date: Jan. 29, 2015

(65) Prior Publication Data
US 2016/0161312 A1    Jun. 9, 2016

(30) Foreign Application Priority Data

Jul. 24, 2013   (JP) .................................. 2013-153119

(51) Int. Cl.
*G01F 1/68*    (2006.01)
*G01F 1/684*   (2006.01)
(Continued)

(52) U.S. Cl.
CPC ............ *G01F 1/684* (2013.01); *G01F 1/6842* (2013.01); *G01F 1/692* (2013.01); *G01F 5/00* (2013.01); *G01F 15/14* (2013.01)

(58) Field of Classification Search
CPC ...... G01F 1/684; G01F 1/6842; G01F 1/6847; G01F 1/692; G01F 5/00; G01F 1/00; F01F 15/14
(Continued)

(56) References Cited

U.S. PATENT DOCUMENTS 6,694,810 B2 *  2/2004  Ueyama .................. G01F 1/684
                                                          73/204.22
2007/0089503 A1 *  4/2007  Nakano ................. G01F 1/6842
                                                          73/204.26
(Continued)

FOREIGN PATENT DOCUMENTS

JP        3-263625 A      11/1991
JP     2010-071724 A       4/2010
(Continued)

OTHER PUBLICATIONS

PCT International Search Report on application PCT/JP2014/052383 dated Mar. 11, 2014; 2 pages.
(Continued)

*Primary Examiner* — Manish S Shah
*Assistant Examiner* — Nigel Plumb
(74) *Attorney, Agent, or Firm* — Foley & Lardner LLP

(57) ABSTRACT

An object of the present invention is to provide a thermal-type air flow meter with a high measurement accuracy by reducing influence of a thermal stress generated in a resistor in an LSI while securing a high positioning accuracy flow rate detection unit. Thus, a thermal-type air flow meter is provided with: a sensor assembly 100 including an LSI 3 having a resistor 7 and a flow rate detection unit 4a which are configured by insert molding so as to expose at least a part of the flow rate detection unit 4a, a housing 301 which has secondary passages 305i, 305o and 305s, and houses the sensor assembly 100 by allowing the flow rate detection unit
(Continued)

4a to be arranged in the secondary passage 305s, the sensor assembly 100 being molded using a first resin, and the housing 301 being molded using a second resin, the sensor assembly 100 being fixed to the housing 301 using the second resin; and resin structures 20 and 21 which cause a tensile stress in a direction parallel to a surface on which the flow rate detection unit 4a is exposed with respect to the sensor assembly 100.

5 Claims, 7 Drawing Sheets

(51) Int. Cl.
*G01F 1/692* (2006.01)
*G01F 5/00* (2006.01)
*G01F 15/14* (2006.01)

(58) Field of Classification Search
USPC .................... 73/204.22, 204.23, 204.11, 861
See application file for complete search history.

(56) References Cited

U.S. PATENT DOCUMENTS

| | | | | |
|---|---|---|---|---|
| 2011/0296904 A1* | 12/2011 | Tagawa | ................... | G01F 1/684 73/114.32 |
| 2012/0000280 A1* | 1/2012 | Kishikawa | ............ | G01F 1/6842 73/204.22 |
| 2012/0240674 A1* | 9/2012 | Sakuma | ................ | G01F 1/6845 73/204.25 |
| 2013/0036806 A1 | 2/2013 | Kohno | | |
| 2014/0227819 A1 | 8/2014 | Sakuma | | |
| 2014/0352424 A1 | 12/2014 | Morino et al. | | |

FOREIGN PATENT DOCUMENTS

| | | | |
|---|---|---|---|
| JP | 2011-148293 A | 8/2011 | |
| JP | 2011-252796 A | 12/2011 | |
| JP | 2012-202786 A | 10/2012 | |
| JP | 2013-036892 A | 2/2013 | |
| WO | WO 2013-084259 A1 | 6/2013 | |
| WO | WO 2013084259 * | 6/2013 | ............. G01F 1/684 |

OTHER PUBLICATIONS

Extended European Search Report dated Mar. 2, 2017 as received in corresponding European Application No. 14828738.6.

* cited by examiner

THERMAL-TYPE AIR FLOW METER

TECHNICAL FIELD

The present invention relates to a thermal-type air flow meter provided with a sensor assembly which is configured by covering a sensor chip with a flow rate detection unit and an LSI to process a signal detected by the flow rate detection unit using resin.

BACKGROUND ART

A thermal-type air flow meter that measures a gas flow rate is configured to be provided with a flow rate detection unit to measure a flow rate, and perform heat transfer between the flow rate detection unit and a gas as a measurement object so as to measure the gas flow rate. The flow rate to be measured by the thermal-type air flow meter is widely used as an important control parameter in various types of devices. A characteristic of the thermal-type air flow meter is that it is possible to measure the gas flow rate, for example, a mass flow rate with a relatively high accuracy as compared to a flow meter of another type.

However, there is a demand for further improvement of measurement accuracy of the gas flow rate. For example, there is an extremely strong demand for fuel saving or exhaust gas purification in vehicles to which internal combustion engines are mounted. In order to cope with such demands, measurement of the amount of intake air, which is a key parameter of the internal combustion engine, with high accuracy has been required. The thermal-type air flow meter that measures the amount of intake air to be guided in the internal combustion engine is provided with a secondary passage which takes a part of the amount of intake air, and a flow rate detection unit arranged in the secondary passage, measures a state of gas to be measured which flows in the secondary passage by the flow rate detection unit performing heat transfer with respect to the gas to be measured, and outputs an electrical signal indicating the amount of intake air to be guided in the internal combustion engine. Such a technique is disclosed in Japanese Patent Application Laid-Open No. 2011-252796 (PTL 1), for example.

An air flow rate measuring device of PTL 1 is provided with a housing forming an internal flow passage in which intake air flows, a sensor chip arranged inside a secondary flow passage, and a circuit chip processing an electrical signal generated by the sensor chip. The sensor chip and the circuit chip are assembled as a sensor assembly serving as a single component (paragraphs 0027 and 0031). The housing has a hole in which the sensor assembly is fit, and a surface in which the hole is formed has two contact surfaces which are in surface contact respectively with two contact surfaces provided in the sensor assembly (paragraph 0033). The surface in which the hole is formed has a rib in surface portions except for the two contact surfaces, and the sensor assembly is fixed to the housing by being press-fitted in the hole so as to be in press contact with a leading end of the rib (paragraph 0034). Accordingly, transmission of linear expansion between the sensor assembly and the housing is blocked such that a stress caused by a linear expansion difference is not applied to the sensor chip or the circuit chip, thereby suppressing a change in resistance value of elements such as the sensor chip and the circuit chip (summary).

CITATION LIST

Patent Literature

PTL 1: Japanese Patent Application Laid-Open No. 2011-252796

SUMMARY OF INVENTION

Technical Problem

It is required to position and fix a flow rate detection unit with high accuracy in a secondary passage provided in a thermal-type air flow meter for measurement of a flow rate of air flowing in a main passage, and to accurately measure the flow rate detected by the flow rate detection unit in order to measure the flow rate of the air with high accuracy using the thermal-type air flow meter. In the technique described in PTL 1, a housing, which is provided with an internal flow passage in which the hole for allowing a sensor assembly to be fit therein is opened, is manufactured using resin in advance, the sensor assembly provided with the flow rate detection unit is manufactured besides the housing, and then, the sensor assembly is fixed to the housing in a state in which the sensor assembly is inserted into the hole of the internal flow passage. A gap between the hole opened at the internal flow passage, and the sensor assembly, and a gap of a portion of the sensor assembly to be fitted in the housing are filled with an elastic adhesive, and a difference between mutual linear expansion coefficients is absorbed by an elastic force of the adhesive.

In addition, it is effective to fix the sensor assembly including the flow rate detection unit simultaneously with molding of the housing in order to reduce a variation in positions or angles of the sensor assembly, and the secondary passage provided in the housing, and to accurately position the sensor assembly (particularly, the flow rate detection unit) with respect to the secondary passage (the internal flow passage).

However, a thermal stress, generated in a resistance in a large scale integration (LSI) (the circuit chip) due to the linear expansion coefficient difference between the sensor assembly and the housing, is higher than the case of using the adhesive, and accordingly, there is a problem that the measurement accuracy is reduced.

An object of the present invention is to provide a thermal-type air flow meter with a high measurement accuracy by reducing influence of a thermal stress generated in a resistor in an LSI while securing a high positioning accuracy of a flow rate detection unit.

Solution to Problem

To achieve the above-described object, a thermal-type air flow meter of the present invention includes: a sensor assembly which includes a circuit unit having a resistor and a flow rate detection unit which are configured by insert molding so as to expose at least a part of the flow rate detection unit; and a housing which has a secondary passage and houses the sensor assembly by allowing the flow rate detection unit to be arranged inside the secondary passage, the sensor assembly being molded using a first resin, and the housing being molded using a second resin, the sensor assembly being fixed to the housing by the second resin forming the housing; and a resin structure which causes a tensile stress in a direction parallel to a surface on which the flow rate detection unit is exposed with respect to the sensor assembly. At this time, in a case in which a resistance arrangement surface side of a circuit unit (LSI) is set as a front surface, it is preferable that a volume of resin of the housing to be formed on a rear surface side of the sensor assembly and cover the sensor assembly be set to be larger than a volume of resin of the housing to be formed on the front surface side of the sensor assembly and cover the sensor assembly. Alternatively, in a case in which the resistance arrangement surface side of the LSI is set as the front surface side, it is preferable that a relation between a thickness t1 of resin of the sensor assembly to be formed on the front surface side of the LSI and a thickness t2 of resin of the sensor assembly to be formed on the rear surface side of the LSI be set to t1<t2.

Advantageous Effects of Invention

According to the present invention, a stress generated toward the LSI is reduced in a case in which the sensor assembly is fixed simultaneously with molding of the housing, and thus, it is possible to obtain the thermal-type air flow meter with the high measurement accuracy while securing a high positioning accuracy of the flow rate detection unit.

Problems, configurations, effects other than the above-described ones will become apparent from the following descriptions of embodiments.

DESCRIPTION OF EMBODIMENTS

Hereinafter, embodiments of the present invention will be described.

Figure 1A:
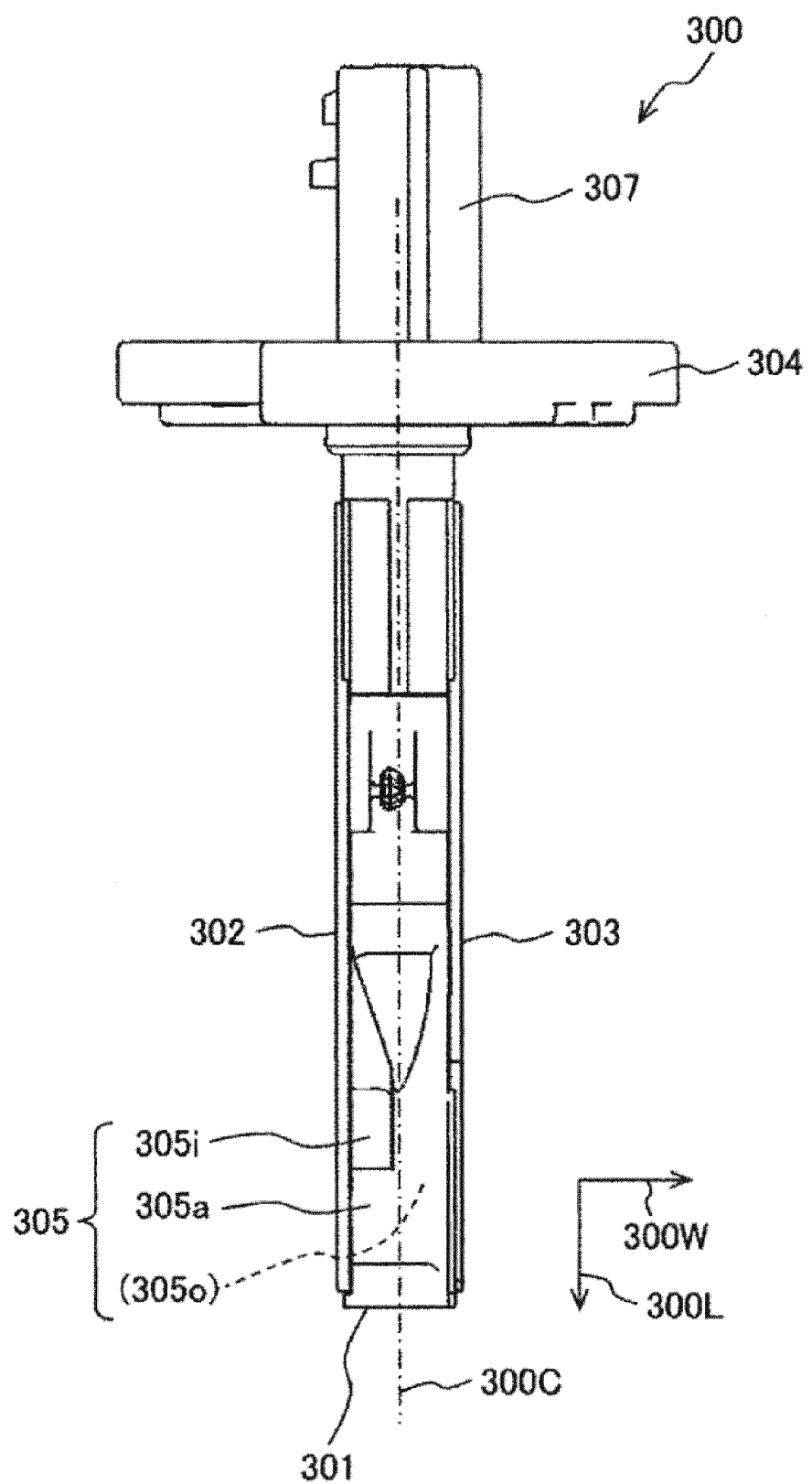
FIG. 1A is a plan view illustrating an upper surface of a thermal-type air flow meter in an embodiment of the present invention.
Figure 1B:
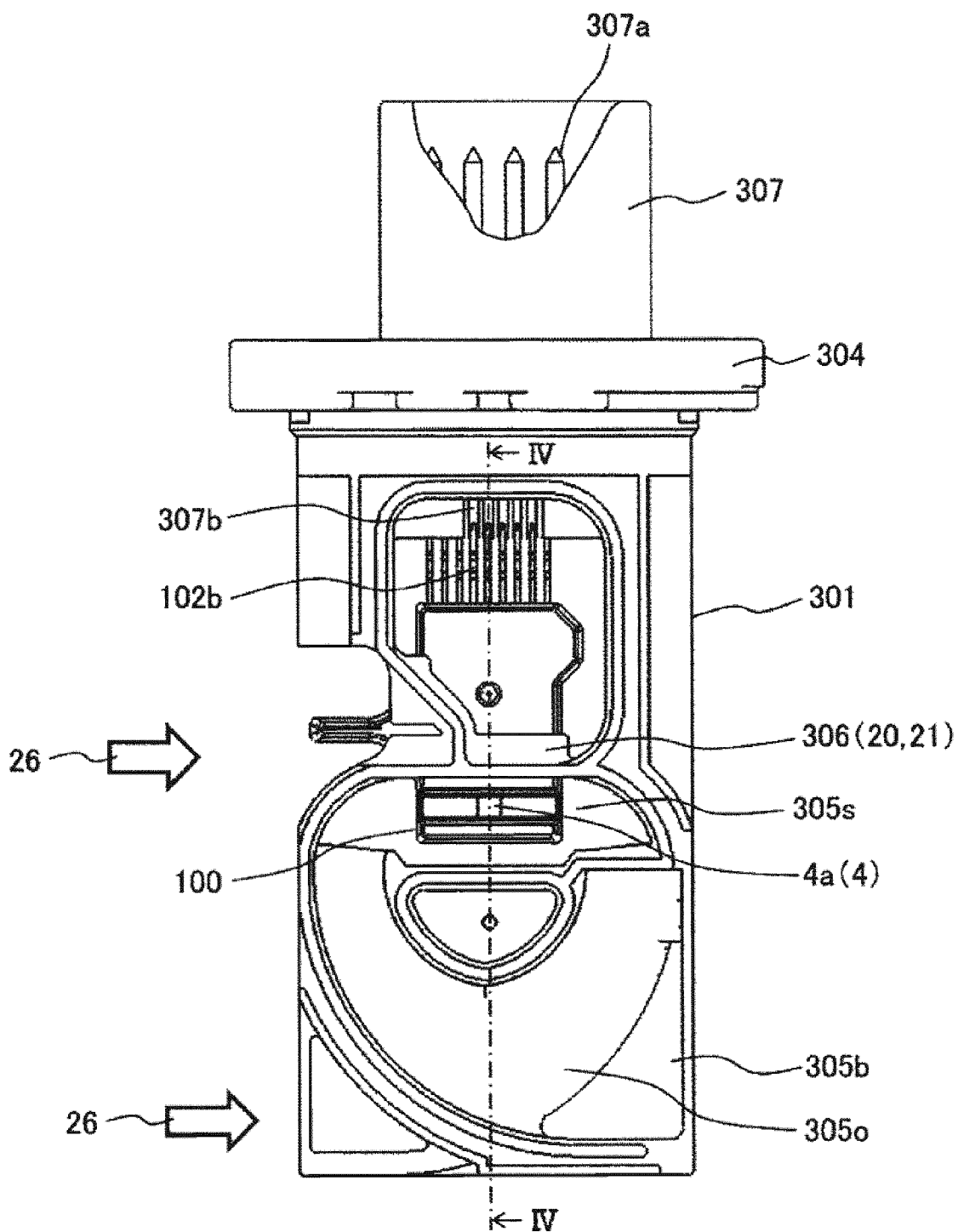
FIG. 1B is a plan view illustrating a right side surface of the thermal-type air flow meter illustrated in FIG. 1A by removing a cover member provided in a side surface.

First, a description will be given regarding the overall configuration of a thermal-type air flow meter with respect to FIGS. 1A and 1B. FIG. 1A is a plan view illustrating an upper surface of the thermal-type air flow meter 300. FIG. 1B is a plan view illustrating a side surface of the thermal-type air flow meter 300 by removing cover members 302 and 303 provided in a side surface. Further, FIG. 1B illustrates a right side surface of FIG. 1A. Further, an arrow 26 illustrated in FIG. 1B indicates a direction of air flowing in an intake pipe (not illustrated). The overall configuration to be described with reference to FIGS. 1A and 1B is the common in the respective embodiments to be described hereinafter.

A surface of the thermal-type air flow meter 300 illustrated in FIG. 1A is provided toward an upstream side of an air flow flowing in the intake pipe. Hereinafter, a vertical direction of the thermal-type air flow meter 300 will be described using aside which is positioned on the upstream side with respect to the air flow flowing in the intake pipe as an upper side, and a side which is positioned on a downstream side as a lower side. This vertical direction does not mean a vertical direction in a mounting state in which the thermal-type air flow meter 300 is attached to an internal combustion engine of an automobile or the like. Further, a length direction 300L and a width direction 300W of the thermal-type air flow meter 300 are defined as illustrated using the arrows of FIGS. 1A and 1B. In addition, a direction perpendicular to the length direction 300L and the width direction 300W will be defined as a height direction. Reference numeral 300C indicates a center line in the width direction 300L.

As illustrated in FIG. 1A, cover members 302 and 303 each of which has a thin plate shape are attached to both side surfaces of a housing 301 of the thermal-type air flow meter 300. The thermal-type air flow meter 300 is provided with a flange portion (attachment portion) 304 which is fixed to a wall surface of the intake pipe and a secondary passage 305 takes a part of the air flowing in the intake pipe on a leading end side of the housing 301. Reference numeral 305a is an inlet opening of the secondary passage 305. The inlet opening 305a is provided across the entire width direction 300L of the housing 301. An inlet-side passage part 305i of the secondary passage 305 has a cross-section of the passage being throttled toward a left side of the center line 300C as approaching the downstream side from the inlet opening 305a. An outlet-side passage part 305o of the secondary passage 305 is formed on an inner side of the inlet-side passage part 305i in a part on the right side of the center line 300C of the inlet-side passage part 305i. Since it is difficult to illustrate the outlet-side passage part 305o on FIG. 1A, a parentheses is attached, and a lead line is also illustrated using a dotted line. The secondary passage 305 is configured of the inlet-side passage part 305i, the outlet-side passage part 305o, and a flow measurement passage part 305s (to be described later) which is provided between the inlet-side passage part 305i and the outlet-side passage part 305o in the flowing direction of the air, and in which a flow rate detection unit 4a of a sensor assembly 100 (see FIG. 1B) is arranged.

A connector unit 307 is provided at the opposite side of a portion provided with the secondary passage 305 in the flange portion 304. A signal line (communication line) which is connected to an external device (for example, an engine control device) is connected to the connector unit 307.

As illustrated in FIG. 1B, the outlet-side passage part 305o and the flow measurement passage part 305s, which configure the secondary passage 305, are provided on the leading end side of the housing 301 (lower side of the paper). A downstream end of the outlet-side passage part 305o communicates with the outlet opening 305b. Although not illustrated in FIG. 1B, the inlet-side passage part 305I of the secondary passage 305 is provided in the inner side of the outlet-side passage part 305o. The flow measurement passage part 305s is formed so as to straddle both sides in the width direction via the center line 300C illustrated in FIG.

1A, and a downstream end of the inlet-side passage part 305i, which is formed on a side surface side (left) with respect to the center line 300C, and an upstream end of the outlet-side passage part 305o, which is formed on the other side surface side (right) with respect to the center line 300C, communicate with each other by the flow measurement passage part 305s.

The sensor assembly 100 is arranged between the secondary passage 305 and the flange portion 304. In the present embodiment, the sensor assembly 100 is fixed to the housing 301 by a fixing portion 306 using the resin forming the housing 301. Gaps in which air flows are provided between a surface on which the flow rate detection unit 4a of the sensor assembly 100 is exposed and a wall surface of the flow measurement passage part 305s and between a rear surface of at the opposite side and the wall surface of the flow measurement passage part 305s. That is, the sensor assembly 100 is arranged in an intermediate portion of the flow measurement passage part 305s in the width direction 300L. Further, the sensor assembly 100 is arranged such that the flow rate detection unit 4a faces a side surface side in which the outlet-side passage part 305o in the thermal-type air flow meter 300 is formed as illustrated in FIG. 1B.

The connector unit 307 is provided with a connection terminal 307a configured to electrically connect the thermal-type air flow meter 300 to the signal line (communication line) which is connected to the external device (for example, the engine control device) so as to perform the communication. The connection terminal 307a is electrically connected to a terminal 307b which is exposed to an inside of the housing 301, and is electrically connected to a lead 102b which is drawn from the sensor assembly 100 via the terminal 307b. The lead 102b configures an input and output terminal of an LSI 103 and an intake temperature detecting element (not illustrated).

Hereinafter, a description will be given regarding embodiments of the sensor assemblies 100 and 100' and holding portions 20 and 21 in a division manner of first to third embodiments.

First Embodiment

A description will be given regarding a first embodiment of a thermal-type air flow meter with reference to FIGS. 2 to 5. Hereinafter, a description will be given regarding an assembly 100 and holding portions 20 and 21 which are characteristic parts of the present embodiment.

Figure 2:
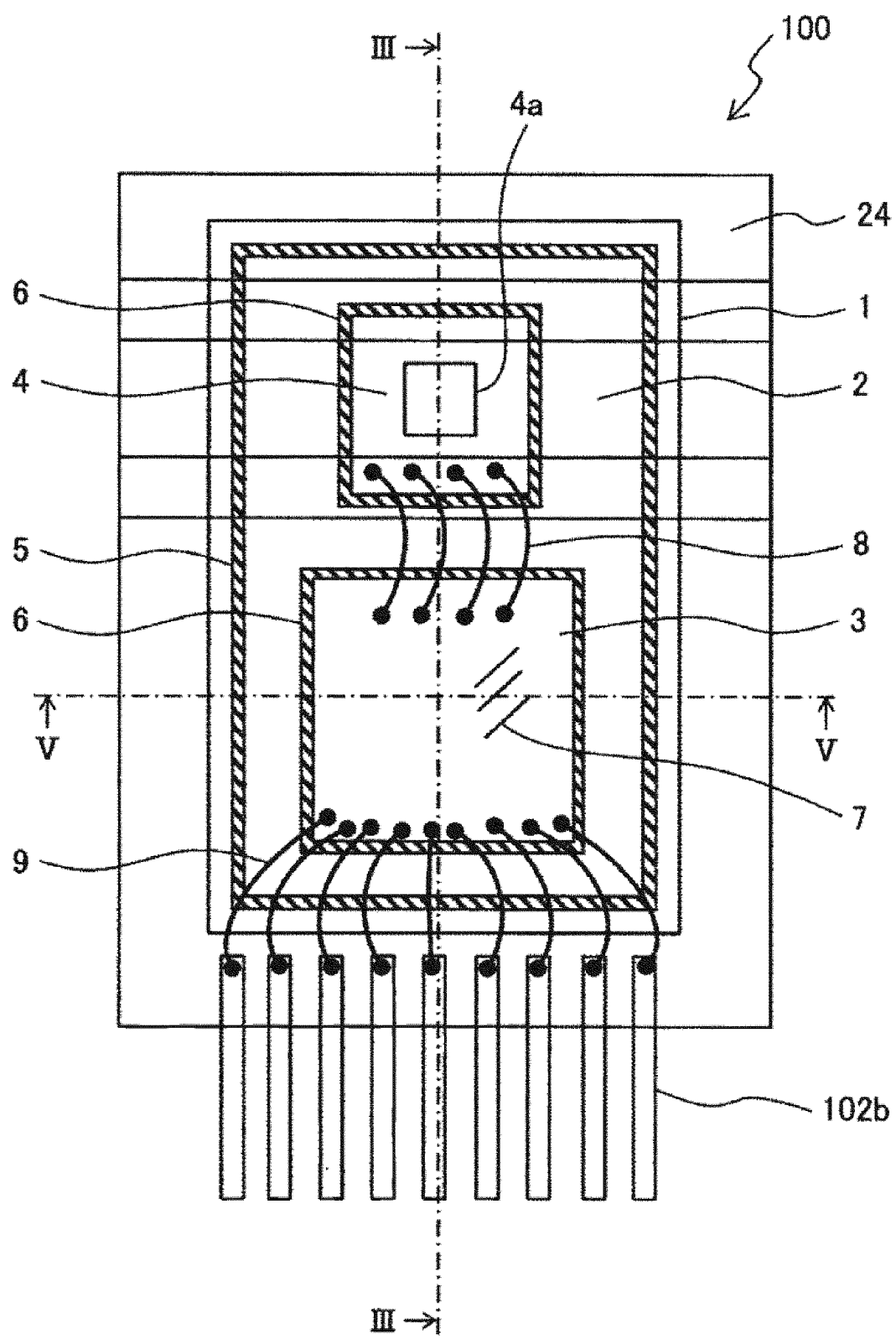
FIG. 2 is a plan view of a sensor assembly in a first embodiment according to the present invention.
Figure 3:
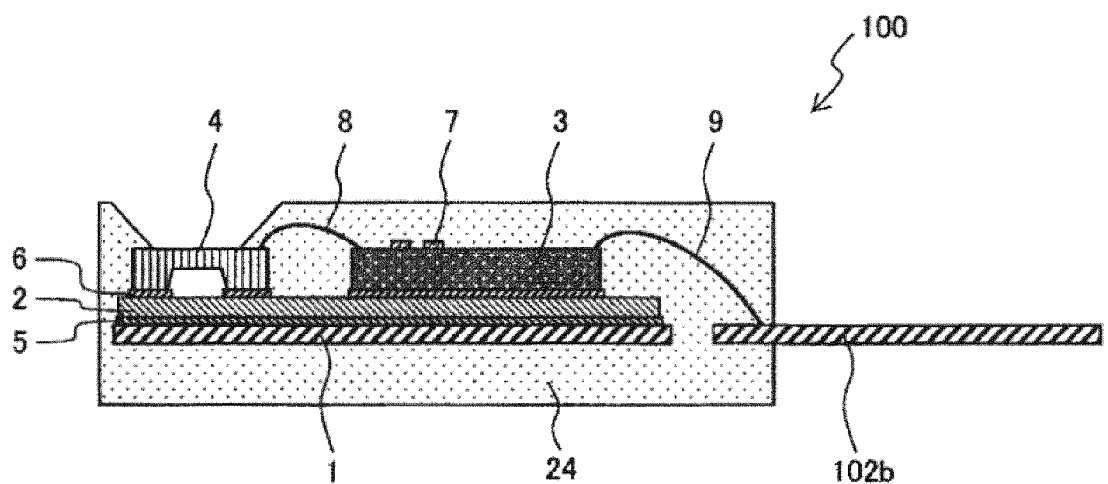
FIG. 3 is a cross-sectional view illustrating a cross-section taken along line III-III of FIG. 2.

FIG. 2 is a plan view after formation of a sensor assembly 100, and FIG. 3 is a cross-sectional view illustrating a cross-section taken along line of FIG. 2. FIG. 2 illustrates a lead frame 1, a ventilation plate 2, an LSI 3, a sensor chip 4 provided in the inside seen through a first resin 24 that covers a periphery thereof.

As illustrated in FIGS. 2 and 3, the sensor assembly 100 is provided with the lead frame 1, the ventilation plate 2, the LSI (circuit unit) 3, and the sensor chip 4 which are covered by the first resin 24. To be specific, the sensor assembly 100 is configured by insert molding the respective insert parts of the lead frame 1, the ventilation plate 2, the LSI (the circuit unit) 3, the sensor chip 4 using the first resin 24 such that at least a part of the flow rate detection unit 4a of the sensor chip 4 is exposed.

Here, the above-described lead 102b is configured to be disconnected from the lead frame 1. Further, the flow rate detection unit 4a is configured on the sensor chip 4. A diaphragm 4a is formed in the sensor chip 4. A heating resistor or a temperature sensitive resistor is formed on the diaphragm 4a, thereby configuring the flow rate detection unit 4a.

For example, a thermosetting resin is used as the first resin 24. According to a detailed manufacturing method, first, the ventilation plate 2 is attached onto the lead frame 1 using an adhesive tape 5, and further, the LSI 3 and the sensor chip 4 are attached onto the ventilation plate 2 using an adhesive tape 6. Incidentally, glass or resin may be used for the ventilation plate 2.

Next, gold wires 8 and 9 are formed to electrically connect between the LSI 3 and the sensor chip 4 and between the LSI 3 and the lead frame 1 using wire bonding. These members are resin-sealed by the first resin 24, thereby completing the sensor assembly 100. The LSI 3 is a circuit unit that converts an analog signal from the sensor chip 4 including the flow rate detection unit 4a into a digital signal, and controls and outputs the converted signal. The circuit unit is configured using a circuit chip (semiconductor chip). A resistor 7 is arranged on a surface of the LSI 3, and the resistor 7 is used for, for example, a reference oscillator (clock), an A/D converter, or the like.

Figure 4:
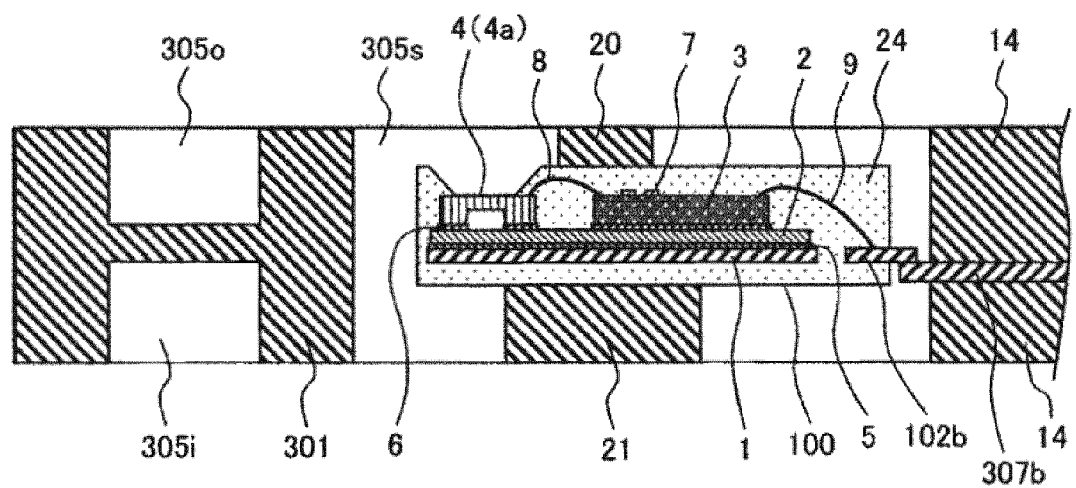
FIG. 4 is a cross-sectional view schematically illustrating a cross-section taken along line IV-IV of FIG. 1B.

A mounting structure of the sensor assembly 100 will be described with reference to FIGS. 1B and 4. FIG. 4 is a cross-sectional view taken along line IV-IV of FIG. 1B. The housing 301 is provided with the secondary passage 305 (305i, 305o) configured to guide the air flowing in the main passage to the sensor chip 4, the holding portions 20 and 21 (which become side walls of the secondary passage) of the sensor assembly 100, and a holding portion 14 of the terminal 307b, and the sensor assembly 100 is fixed to and housed in the housing 11 simultaneously with the formation of the housing 301 made of the second resin. At this time, the flow rate detection unit 4a of the sensor chip 4 including the flow rate detection unit 4a is arranged inside the secondary passage 305 due to the need of measuring the air flow rate. Since the LSI 3 and the sensor chip 4 are arranged to be adjacent to each other, the holding portions 20 and 21 which become the side walls of the secondary passage 305 are positioned between the sensor chip 4 and the LSI 3. Incidentally, the holding portions 20 and 21 are parts illustrated as the fixing portion 306 in FIG. 1B, and the entire circumference in a direction along the flow measurement passage part 305s of the sensor assembly 100 is covered by the second resin. Accordingly, the holding portion 20 and the holding portion 21 are formed on the front surface side of the sensor assembly 100 and the rear surface side of the sensor assembly 100, respectively. Further, the holding portions 20 and 21 are formed at the time of formation of the housing 11 such that a volume of resin of the holding portion 21 on the rear surface side of the sensor assembly 100 is larger than a volume of resin of the holding portion 20 on the front surface side of the sensor assembly 100 as illustrated in FIG. 4.

Next, an operational effect according to the first embodiment will be described. The sensor assembly 100 is formed using the first resin 24, and the housing 301 is formed using the second resin. Further, the first resin 24 and the second resin are different materials. For example, the first resin 24 uses the thermosetting resin, and the second resin uses a thermoplastic resin. Thus, a thermal stress caused by a difference in linear expansion coefficients between the first resin 24 and the second resin, or a compressive stress caused by a shrinkage stress due to a difference in resin shrinkage is generated on interfaces with the sensor assembly 100 by the holding portions 20 and 21. Accordingly, a compressive stress is generated also in the resistor 7 inside the LSI 3 which is adjacent to the holding portions 20 and 21. When the stress (strain) is generated in the resistor 7, a resistance value is changed by the piezoelectric effect, and an output characteristic of the LSI 3 is changed, and thus, the measurement accuracy of the air flow rate deteriorates.

Figure 5:
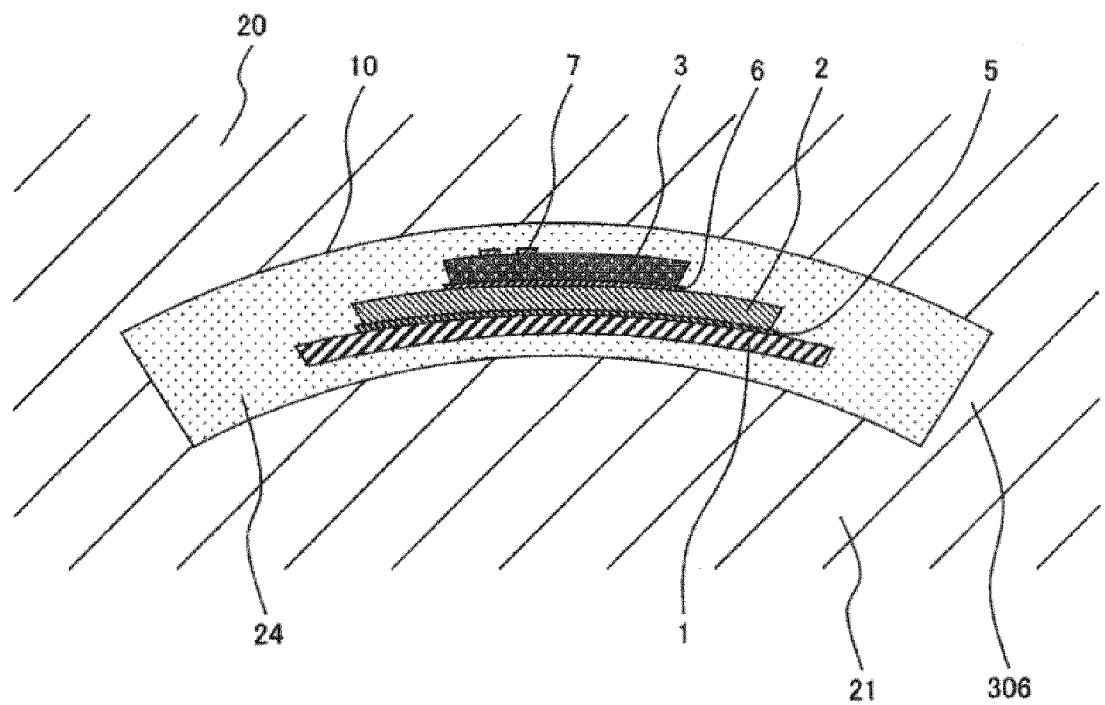
FIG. 5 is a schematic view illustrating an aspect of deformation of the sensor assembly regarding a cross-section taken along line V-V of FIG. 2.

In the present embodiment, the resin volume of the holding portion 20 is set to be smaller than the resin volume of the holding portion 21. Accordingly, a warpage as illustrated in FIG. 5 is generated in the sensor assembly 100 by the difference in resin shrinkage between the holding portions 20 and 21. FIG. 5 is a cross-sectional view illustrating a cross-section taken along line V-V of FIG. 2, and illustrates a shape of warping deformation. As illustrated in FIG. 5, a warpage similar to that of the sensor assembly 100 is generated also in the LSI 3. As a result, a tensile stress is applied to the resistor 7, and thus, it is possible to reduce the compressive stress generated in the resistor 7 by the holding portions 20 and 21. That is, the warpage is generated in the sensor assembly 100 by the difference in shrinkage between the holding portion 20 and the holding portion 21 in the present embodiment. The warpage causes the tensile stress that offsets or reduces the above-described compressive stress to be received by the LSI 3. The amount of shrinkage of the holding portion 21 on the rear surface side of the sensor assembly 100 is set to be larger than that of the holding portion 20 on the front surface side of the sensor assembly 100 in order to generate the warpage.

Second Embodiment

A description will be given regarding a second embodiment of a thermal-type air flow meter with reference to FIGS. 6 and 7. Hereinafter, a description will be given regarding a sensor assembly 100' which is a characteristic part of the present embodiment.

Figure 6:
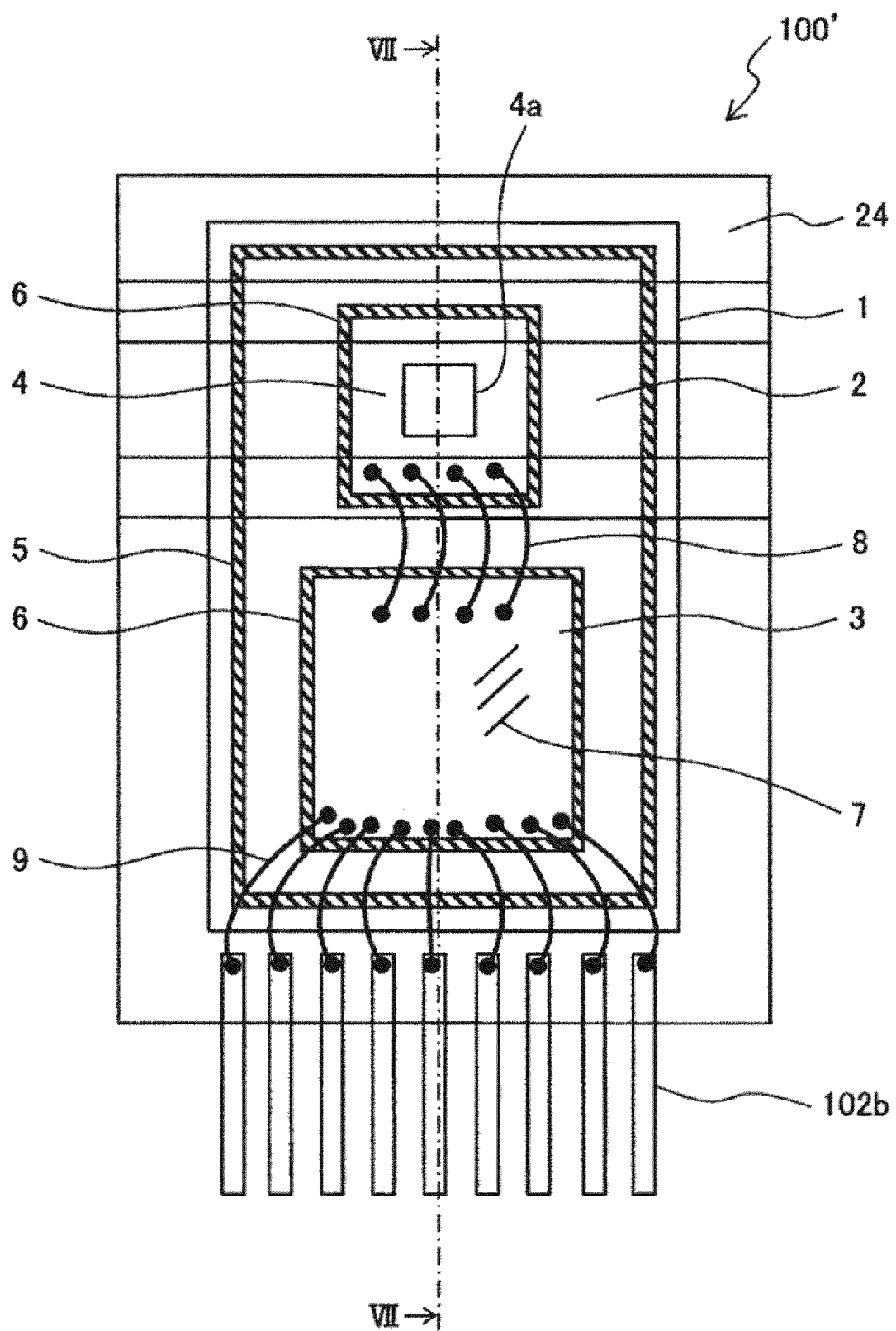
FIG. 6 is a plan view of a sensor assembly in a second embodiment according to the present invention.
Figure 7:
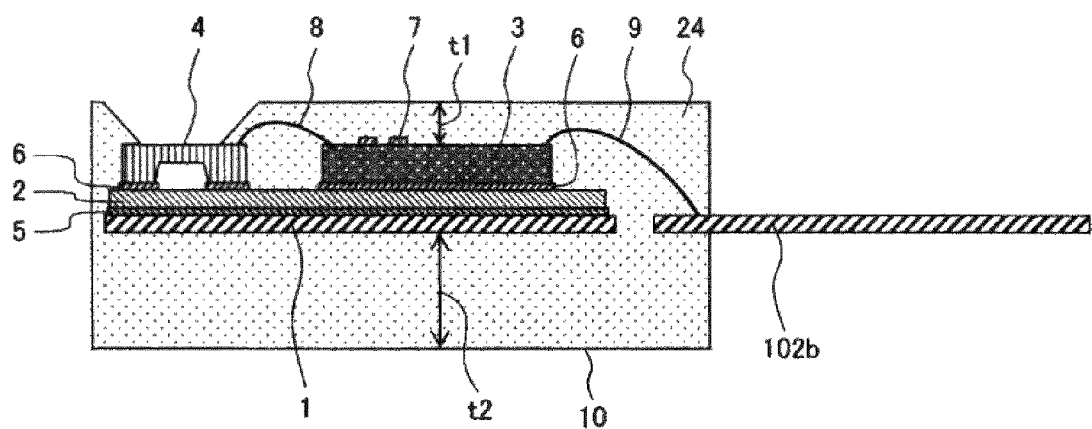
FIG. 7 is a cross-sectional view illustrating a cross-section taken along line III-III of FIG. 6.

FIG. 6 is a front view of the sensor assembly, and FIG. 7 is a cross-sectional view illustrating a cross-section taken along line IIV-IIV of FIG. 6. Although a basic configuration of the sensor assembly 100' is the same as that of the first embodiment, the sensor assembly 100' is formed such that a thickness t1 of resin on a front surface side of the sensor assembly 100' and a thickness t2 of resin on a rear surface side of the sensor assembly 100' are set to be t1<t2.

Next, an operational effect according to the second embodiment will be described. In the sensor assembly 100', a compressive stress, caused by resin shrinkage and heat shrinkage of the first resin 24 in an interface between the LSI 3 and the first resin 24, is generated in the resistor 7. Since the relation of t1<t2 is established regarding the resin thicknesses t1 and t2 of the front surface side and the rear surface side of the sensor assembly 100' in the present embodiment, the warpage illustrated in FIG. 5 is generated in the sensor assembly 100' due to a difference in heat shrinkage between the front surface side and the rear surface side of the first resin 24, and the similar warpage is generated also in the LSI 3. As a result, the tensile stress is applied to the resistor 7 inside the LSI 3, and it is possible to reduce or offset the compressive stress generated in the resistor 7. Needless to say, it is possible to reduce the compressive stress generated in the resistor 7 when it is configured by combining the structure of the sensor assembly 100' illustrated in the present embodiment and the structure of the housing 301 illustrated in the first embodiment.

Third Embodiment

Figure 8:
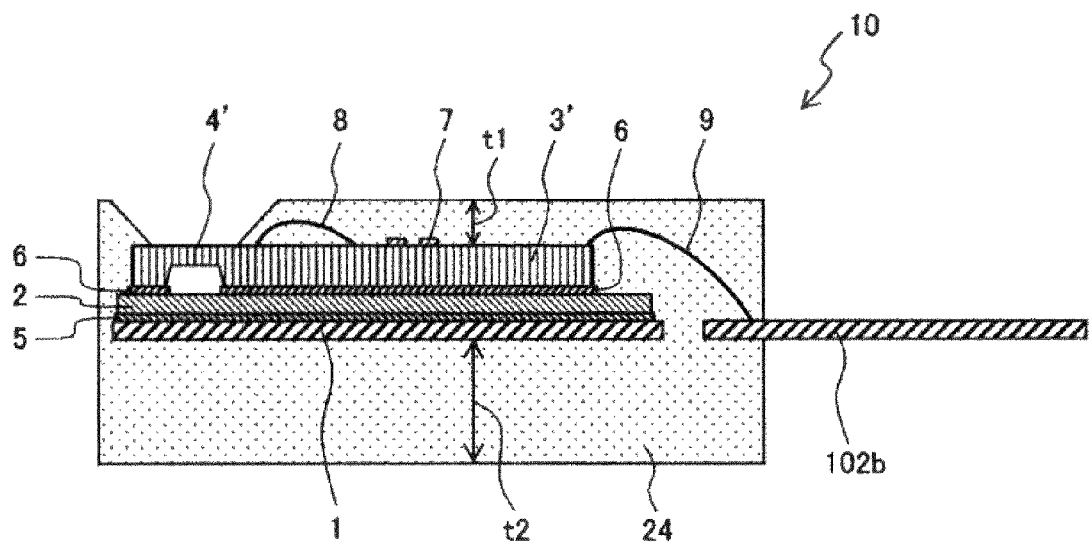
FIG. 8 is a cross-sectional view illustrating a sensor assembly in a third embodiment according to the present invention using the same cross-section as that of FIG. 3 and FIG. 7.

A description will be given regarding a third embodiment of a thermal-type air flow meter with reference to FIG. 8.

Hereinafter, a description will be given regarding a sensor assembly 100" which is a characteristic part of the present embodiment. FIG. 8 is a cross-sectional view illustrating the sensor assembly 100" of the third embodiment according to the present invention using the same cross-section as that of FIG. 3 and FIG. 7.

In the present embodiment, a sensor chip 4 and LSI (a circuit unit) 3 are integrated and configured as a single semiconductor chip in the sensor assembly 100' of the second embodiment. The thickness t1 of resin on a front surface side of the sensor assembly 100" and the thickness t2 of resin on a rear surface side of the sensor assembly 100' are formed to be t1<t2 also in this case, and accordingly, the same effect as that of the second embodiment is obtained, and the measurement accuracy of the flow rate is improved.

The present embodiment can be also combined with the holding portions 20 and 21 of the first embodiment. Alternatively, the sensor chip 4 and the LSI 3 may be integrated and configured as the single semiconductor chip also in the first embodiment as in the present embodiment.

The first embodiment, the second embodiment, and the third embodiment are provided with a resin structure in which the tensile stress is caused in a direction parallel to a surface on which the flow rate detection unit 4a is exposed with respect to each of the sensor assemblies 100, 100' and 100". This resin structure is a structure in which the volume of resin existing on each front surface side of the sensor assemblies 100, 100' and 100" on which the flow rate detection unit 4a is exposed with respect to the LSI (the circuit unit) 3 and the volume of resin existing on each rear surface side of the sensor assemblies 100, 100' and 100" are set to be different. Further, the tensile stress is generated by the warping deformation on the sensor assemblies 100, 100' and 100" caused by the resin structure, and the above-described compressive stress is offset or reduced as the resistor 7 of the LSI 3 is positioned at a part on which the tensile stress acts. The resin structure is a structure in which the volume of the second resin (resin forming the holding portion 20), which is in contact with a surface of the front surface side of the sensor assembly 100, and the volume of the second resin (resin forming the holding portion 21), which is in contact with a surface of the rear surface side of the sensor assembly 100, are set to be different in the first embodiment. Further, the volume of the second resin (resin forming the holding portion 21) which is contact with the surface of the rear surface side of the sensor assembly 100 is larger than the volume of the second resin (resin forming the holding portion 20) which is in contact with the surface on the front surface side of the sensor assembly 100. At this time, the thickness of the first resin 24 provided on the rear surface side of the sensor assembly 100 with respect to the LSI 3 may be set to be thicker than the thickness of the first resin 24 provided on the front surface side of the sensor assembly 100 with respect to the LSI 3 as in the sensor assembly 100' described in the second embodiment. Further, the resin structure is implemented by the structure in which the thickness of the first resin provided on the rear surface side of the sensor assembly 100' with respect to the LSI 3 is set to be thicker than the thickness of the first resin provided on the front surface side of the sensor assembly 100' with respect to the LSI 3 in the second embodiment.

Incidentally, the present invention is not limited to the respective embodiments described above, but can include various types of modified examples. For example, the above-described embodiments have been described in detail in order to facilitate understanding of the present invention, and are not necessarily limited to an invention provided with the entire configuration. Further, the configuration of an embodiment may be partially replaced with a configuration of another embodiment, and the configuration of an embodiment may be added to the configuration of another embodiment. Further, another configuration may be partially added to, removed from, and replaced with configurations of the embodiments.

INDUSTRIAL APPLICABILITY

The present invention can be applied to a measurement device for measurement of the above-described gas flow rate.

REFERENCE SIGNS LIST 1 lead frame
2 ventilation plate
3 LSI
4 sensor chip
5 adhesive tape
6 adhesive tape
7 resistor
8 gold wire
9 gold wire
100, 100', 100" sensor assembly
11 housing
12 secondary passage
14 holding portion
20 holding portion
21 holding portion
24 first resin
26 air

The invention claimed is:

1. A thermal air flow meter comprising:
a sensor assembly which includes a circuit unit having a resistor, a flow rate detection unit, and molding including a first resin, so as to expose at least a part of the flow rate detection unit; and
a housing which has a secondary passage and houses the sensor assembly by allowing the flow rate detection unit to be arranged inside the secondary passage,
wherein the housing comprises a resin structure that includes a second resin,
the sensor assembly is fixed to the housing by the second resin, and
the resin structure that comprises the second resin, when undergoing shrinkage, causes a tensile stress in a direction parallel to a surface of the sensor assembly on which the flow rate detection unit is exposed with respect to the sensor assembly,
wherein a volume of the second resin which is in contact with the surface on a front surface side of the sensor assembly on which the flow rate detection unit is exposed is smaller than a volume of the second resin which is in contact with a surface on a rear surface side of the sensor assembly which is opposite to the front surface side.

2. The thermal air flow meter according to claim 1, wherein
the tensile stress is generated by the resin structure causing warping deformation in the sensor assembly, and
the resistor of the circuit unit is positioned at a part on which the tensile stress acts.

3. The thermal air flow meter according to claim 2, wherein
a thickness of the first resin provided on the rear surface side of the sensor assembly with respect to the circuit unit is set to be thicker than a thickness of the first resin provided on the front surface side of the sensor assembly with respect to the circuit unit.

4. The thermal air flow meter according to claim 2, wherein
the resin structure is a structure in which a thickness of the first resin provided on the rear surface side of the sensor assembly with respect to the circuit unit is set to be thicker than a thickness of the first resin provided on the front surface side of the sensor assembly with respect to the circuit unit.

5. The thermal air flow meter according to claim 2, wherein
the first resin is a thermosetting resin, and the second resin is a thermoplastic resin.

* * * * *